United States Patent [19]

Edler

[11] Patent Number: 5,085,582
[45] Date of Patent: Feb. 4, 1992

[54] SILICON NITRIDE CONTAINERS FOR THE SINTERING OF SILICON NITRIDE CERAMICS

[75] Inventor: James P. Edler, Troy, Mich.

[73] Assignee: Eaton Corporation, Cleveland, Ohio

[21] Appl. No.: 557,520

[22] Filed: Jul. 24, 1990

[51] Int. Cl.$^5$ .............................................. F27B 14/00
[52] U.S. Cl. ................................... 432/156; 432/262; 432/263; 432/265
[58] Field of Search ...................... 432/156, 262, 265

[56] References Cited

U.S. PATENT DOCUMENTS

| | | |
|---|---|---|
| 779,474 | 7/1955 | Schifferli, Jr. . |
| 1,085,540 | 1/1914 | Case, Jr. ............................. 432/156 |
| 1,213,082 | 1/1917 | Dörinckel ........................... 432/156 |
| 2,263,309 | 11/1941 | Murphy ............................... 432/156 |
| 2,268,589 | 1/1942 | Henny . |
| 2,383,353 | 8/1945 | Steele ................................. 432/156 |
| 2,472,456 | 6/1949 | Aricetti .............................. 432/265 |
| 2,543,700 | 2/1951 | Leitten et al. ..................... 432/262 |
| 2,869,215 | 1/1959 | Smith . |
| 3,186,696 | 6/1965 | Hildebrand ........................ 432/156 |
| 3,205,080 | 9/1965 | Ryshkewitch . |
| 3,222,438 | 12/1965 | Parr et al. . |
| 3,669,723 | 6/1972 | Parr et al. . |
| 3,819,786 | 6/1974 | Wells May . |
| 3,887,412 | 6/1975 | Styhr et al. . |
| 3,950,464 | 4/1976 | Masaki . |
| 3,991,166 | 11/1976 | Jack et al. . |
| 3,992,497 | 11/1976 | Terwilliger et al. . |
| 4,033,400 | 7/1977 | Gurwell et al. . |
| 4,036,653 | 7/1977 | Jacobson . |
| 4,067,943 | 1/1978 | Ezis et al. . |
| 4,090,851 | 5/1978 | Berkman et al. .................. 432/265 |
| 4,119,689 | 10/1978 | Prochazka et al. . |
| 4,164,528 | 8/1979 | Yajima et al. . |
| 4,235,857 | 11/1980 | Mangels . |
| 4,285,895 | 8/1981 | Mangels . |
| 4,354,990 | 10/1982 | Martinengo et al. . |
| 4,356,136 | 10/1982 | Mangels . |
| 4,376,742 | 3/1983 | Mah . |
| 4,377,542 | 3/1983 | Mangels et al. . |
| 4,410,636 | 10/1983 | Minjolle et al. . |
| 4,443,394 | 4/1984 | Ezis . |
| 4,471,060 | 9/1984 | Dickie et al. . |
| 4,495,155 | 1/1985 | Ricard et al. ...................... 432/263 |
| 4,519,967 | 5/1985 | Crosbie et al. . |
| 4,747,774 | 5/1988 | Piotrowski et al. ................ 432/156 |
| 4,781,874 | 11/1988 | Edler . |

FOREIGN PATENT DOCUMENTS

| | | |
|---|---|---|
| 076549 | 6/1977 | Japan . |
| 081250 | 5/1983 | Japan . |

OTHER PUBLICATIONS

Sacks, et al., Properties of Silicon Suspensions and Slip-Cast Bodies, 1985, 1109-1123.
Jahn, Processing of Reaction Bonded Silicon Nitride, 1989, 1-24.
Williams, et al., Slip Casting of Silicon Shapes and Their Nitriding, 1983, pp. 607-619.
Mangels, Effect of Rate-Controlled Nitriding and Nitriding Atmospheres on the Formation of Reaction-Bonded, $Si_3N_4$, 1981, pp. 613-617.
Moulson et al., Nitridation of High-Purity Silicon, 1975, pp. 285-289.
Shaw et al., Thermodynamics of Silicon Nitridation: Effect of Hydrogen, 1982, pp. 180-181.
Moulson, Reaction-Bonded Silicon Nitride: its Formation and Properties, 1979, pp. 1017-1051.

Primary Examiner—Henry C. Yuen
Attorney, Agent, or Firm—P. S. Rulon; L. E. Cargill

[57] ABSTRACT

An enclosable vessel for containing a silicon nitride article during sintering in a furnace to protect the silicon nitride article from thermal decomposition and contamination reactions with furnace materials comprises a closeable walled container formed of a reaction bonded silicon nitride material having an opening to allow interior placement of the silicon nitride article within the walled container. This box is used to replace silicon nitride powder which has heretofore been used to cover silicon nitride articles during sintering.

21 Claims, 2 Drawing Sheets

SILICON NITRIDE CONTAINERS FOR THE SINTERING OF SILICON NITRIDE CERAMICS

TECHNICAL FIELD

This invention relates generally to the sintering of silicon nitride bodies and more particularly relates to containers for enclosing silicon nitride bodies during a sintering operation.

BACKGROUND OF THE INVENTION

The current practice for the manufacture of sintered silicon nitride ceramics includes the use of a refractory material container (typically formed of graphite) in which the silicon nitride article is placed before sintering. A setter powder of silicon nitride or boron nitride or a mixture thereof is poured into the container to cover the silicon nitride articles being sintered to protect them from thermal decomposition and reaction with the furnace materials. Without this protection, experience has shown that a silicon nitride article will decompose at 1800° C. in part to silicon and nitrogen. Furthermore, if the will react with the carbon in the graphite to form silicon carbide, which is stable at 1800° C. When setter powder is used, the powder itself decomposes due to the high temperature in the furnace and the powder reacts preferentially with the furnace material instead of the silicon nitride article.

The above described method of using setter powder has been found undesirable, however, because the powder must be cleaned off of the article after sintering. At times, the powder on a silicon nitride article sinters together or sinters to the article, thus, requiring excessive force to remove the sintered material. Sometimes the sintered material cannot be removed even with force, and the article must be scrapped.

Recycling of the setter powder is not without its problems either. Firstly, during use, there is inherent loss of setter powder (due to spillage, etc.), making the operation more costly. It has been known to lose as much powder in weight as the silicon nitride article itself. In addition, during recycling, of&:en the setter powder needs to be crushed and screened to break-up the sintered pieces before reusing.

Yttria or other sintering aids are sometimes added to the setter powder, because, if the silicon nitride article contains these sintering aids, the sintering aids are "robbed" from the article by the setter powder during sintering unless the setter powder also contains the aids. In instances when sintering aids are added to the setter powder, the setter powder typically is chemically analyzed to ensure that the sintering aids are present in the proper amounts.

It is the primary object of the present invention to provide a device which prevents silicon nitride articles from thermally decomposing or reacting with furnace materials during sintering.

It is another object of the present invention to provide a device which provides protective coverage to a silicon nitride article during sintering operations and which is easy to use, readily reusable without any additional manipulation of the device, and one which does not require any additional steps of operation, such as post-cleaning of the sintered article. It is yet another object of the invention to provide a protective vessel for containing reaction bonded silicon nitride parts, such as mechanical seals.

SUMMARY OF THE INVENTION

In accordance with the preferred embodiment of the invention, these and other objects and advantages are addressed as follows. An enclosable vessel is disclosed for containing a silicon containing article during sintering in a furnace to protect the silicon nitride article from thermal decomposition and contamination reactions with furnace materials. The enclosable vessel is a closable walled container formed of silicon nitride having an opening to allow interior placement of the silicon nitride article within the walled container. The vessel is preferably formed of reaction bonded silicon nitride, and may be boxed-shaped or cylindrically-shaped. Furthermore, it is advantageous for a hole to be left in the walled container for gaseous communication between the inside and the outside of the vessel.

The enclosable vessel may further include elongated support pieces also formed of silicon nitride, or reaction bonded silicon nitride, in order to support the silicon nitride article to be sintered. The sinter box, or enclosable vessel, may also comprise a flat support plate for placement on top of the elongated support pieces to support the silicon nitride article.

BRIEF DESCRIPTION OF THE DRAWINGS

The nature and extent of the present invention will be clear from the following detailed description of the particular embodiments thereof, taken in conjunction with the appended drawings, in which.

DETAILED DESCRIPTION OF PREFERRED EMBODIMENTS OF THE INVENTION

Figure 1:
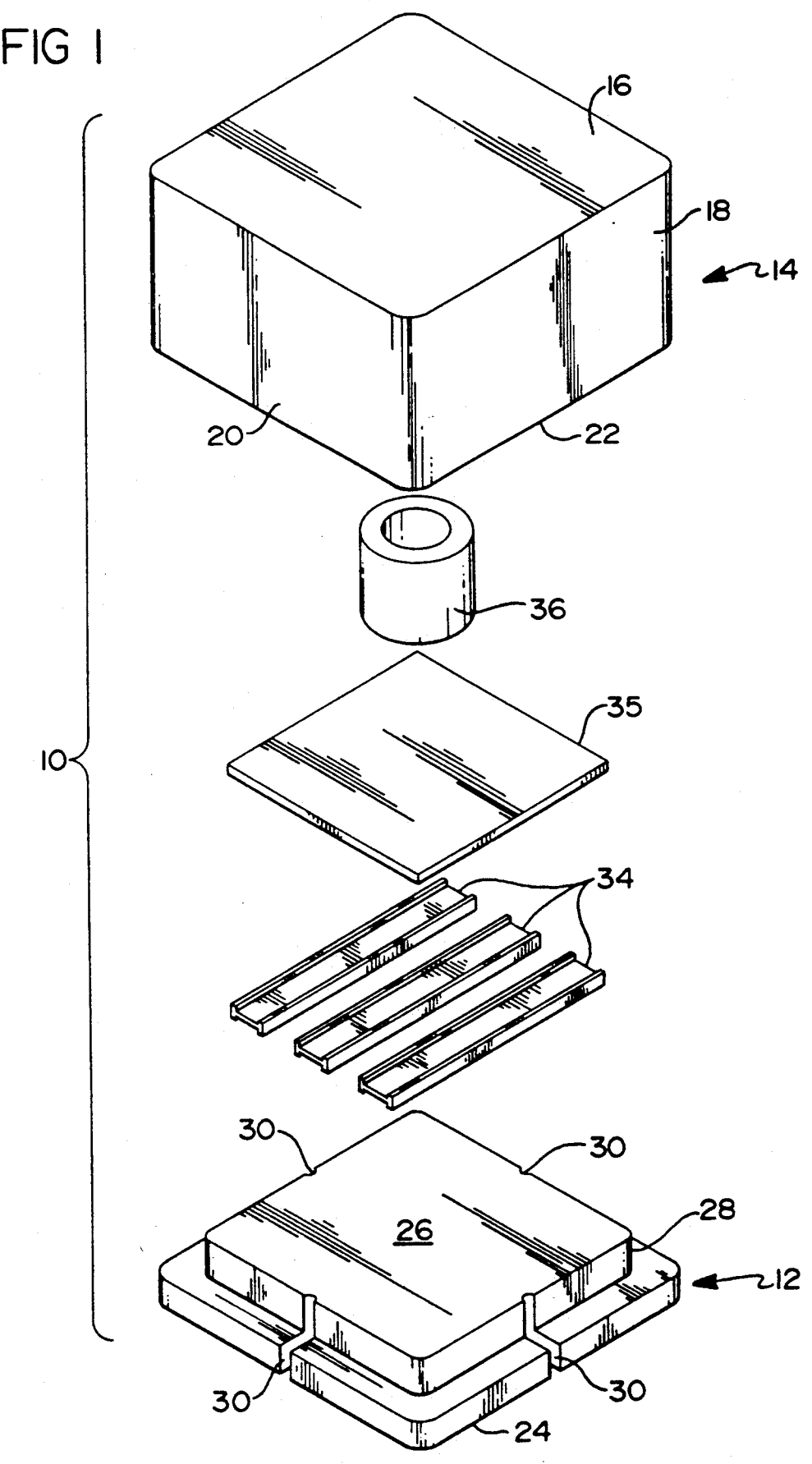
FIG. 1 shows an exploded perspective view of a sinter box constructed in accordance with the present invention with a silicon nitride article positioned between the lid of the sinter box and a flat support piece.

Referring first to FIG. 1, one embodiment of the invention is shown as a sinter box generally denoted by the numeral 10. The sinter box is shown as being made of a flat support piece referred to as base 12 and a box-shaped lid 14, both formed of reaction bonded silicon nitride. Lid 14 includes a top wall 16 and four vertical side walls 18 and 20 substantially perpendicular to top wall 16 to form the reaction bonded silicon nitride sinter box 10. At the bottom of lid 14 is bottom opening 22 as defined by the bottom edges of side walls 18 and 20.

Base 12 is shown as having a flat bottom ridge 24 for receiving lid 14 and a platform 26 thereupon onto which a silicon nitride article 36 is placed for sintering. In practice, silicon nitride article 36 is placed in sinter box 10, and then the sinter box is placed into a sintering furnace (not shown) for sintering of the article 36. As with any conventional sintering method, the temperature of the sintering furnace is elevated, preferably within a nitrogen atmosphere. Platform 28 has a flat upper surface 26 which is dimensioned to fit within and under bottom opening 22 of lid 14. Preferably the fit of platform 28 into opening 22 is such that lid 14 is easily placed on base 12 with little or no force.

As shown in FIG. 1, base 12 includes four slits 30 extending upwardly through bottom ridge 24 and platform 26, one on each side. The slits 30 provide atmospheric communication between the inside of sinter box 10 and the sintering gas atmosphere within the furnace when closed, thereby allowing gases to flow in and out of sinter box 10 during sintering. The atmospheric communication is important when the sinter box is in a furnace in which the atmospheric pressure is changed by pressurization or evacuation to create a partial vacuum.

The atmospheric communication between inside and outside the sinter box can be accomplished in various ways. For example, there may be slits in the edges of the side walls at the opening of lid 14 rather than having slits in base 12. Alternatively, it is contemplated that lid 14 may have a few small holes extending through the side walls. Any such openings or gaps between the lid and the base will suffice so long as they are small enough so as to avoid thermal decomposition of the silicon nitride article and small enough to substantially prevent reaction between the silicon nitride article with the furnace materials during sintering. However, the openings must be large enough to allow for gas exchanges and atmospheric pressure changes within the box without exploding the lid off (during decreasing pressure outside the box) or imploding the sinter box (during increasing pressure outside the box).

Referring again to FIG. 1, three elongated support pieces 34 which are formed of reaction bonded silicon nitride are shown between base 12 and flat support plate 35. In position, elongated support pieces 34 rest on flat upper surface 26, and flat support plate 35, in turn, rests on elongated support pieces 34. Elongated support pieces 34 and flat support plate 35 may be used to support the silicon nitride article indicated by reference numeral 36, although the silicon nitride article 36 may rest directly on platform 28 without using either &he support pieces 34 or the support plate 35. It has been found, though, that the elongated support pieces 34 and flat support plate 35 provide a useful means for separating article 36 from base 12 during sintering to help assure no "gluing" of article 36 to base 12 which may occur during the sintering operation.

It should also be noted that article 36 may be a green body silicon article, i.e. one which has rot yet been nitrided. It is contemplated that, in the event of the use of a continuous kiln-type furnace, the articles 36 may be placed in a sinter box of the present invention at the beginning of the process as a green body article. The green body within the sinter box may move through the continuous furnace from a first station to a nitriding station and then move to a sintering station without breaking atmosphere. In the event that it is desired to move a green body article through these steps without breaking atmosphere, it would be advantageous to place the greenbody articles into the sinter box before placement in the continuous furnace and before nitriding.

Figure 2:
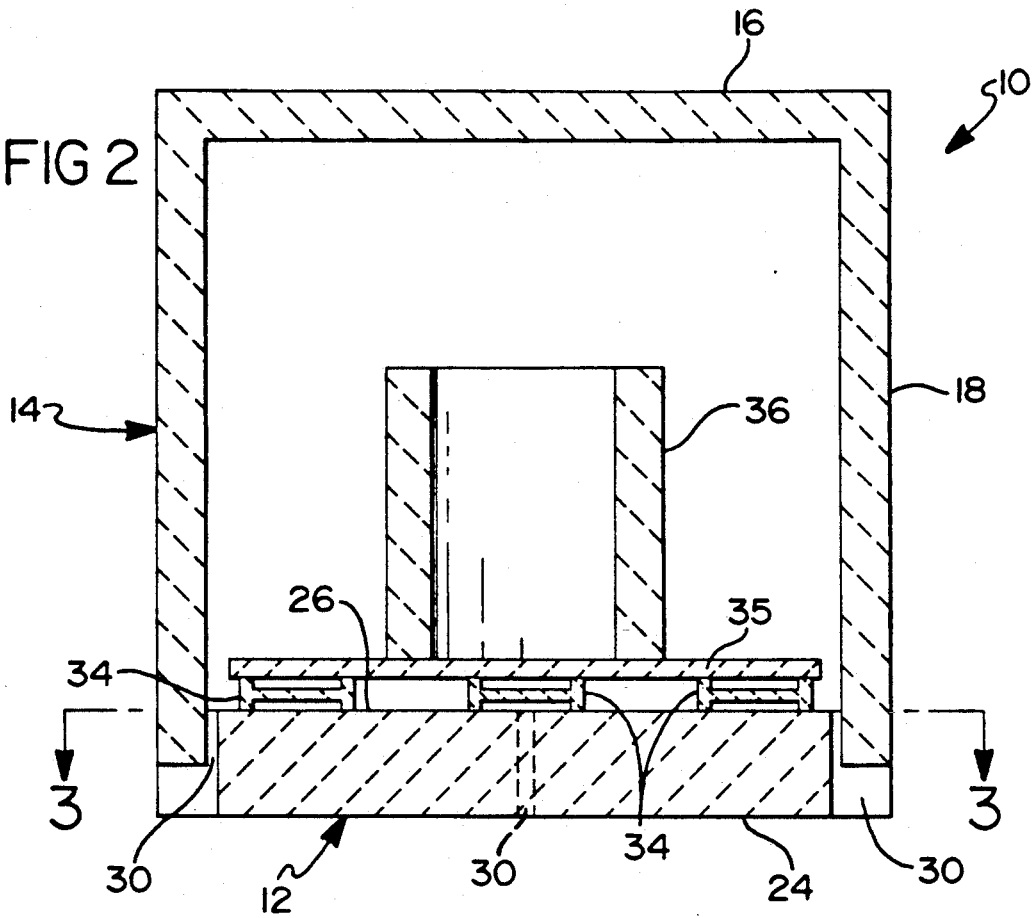
FIG. 2 shows a cross-sectional side view of an assembled sinter box constructed in accordance with the present invention which is cut in half vertically by cutting perpendicular to two sides of the sinter box, further showing elongated support pieces, a flat support plate, and a silicon nitride article as positioned in place within the sinter box.

Looking now to FIG. 2, there is illustrated a cross-sectional view of sinter box 10 on FIG. 1 containing article 36 as cut in half vertically and perpendicular to two sides of the sinter box. The same reference numerals are used in both FIGS. 1, 2 and 3.

Figure 3:
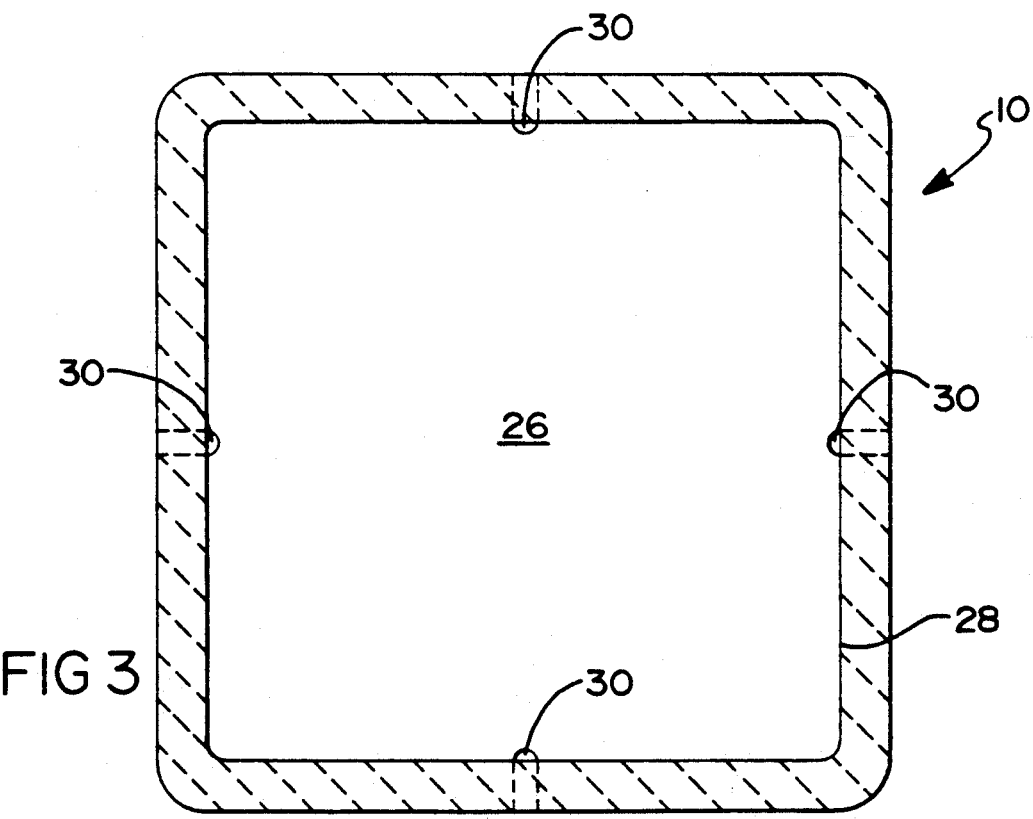
FIG. 3 shows a cross-sectional view of a sinter box constructed in accordance with the present invention taken along lines 3—3 of FIG. 2.

FIG. 3 illustrates a cross-sectional view of sinter box 10 as taken along lines 3—3 of FIG. 2 and clearly shows detail of the bottom of the sinter box.

As mentioned above, the sinter box and optional elongated support pieces and flat support plate can be formed of reaction-bonded silicon nitride and are prepared by techniques known in the art. For example, a mixture of silicon particles and nitriding agents are compacted into the desired shapes to form the sinter box and nitrided by exposing the compacted silicon to a nitrogen — containing atmosphere while heating the compact to about 1400° C. Preferably, substantially all of the silicon of the sinter box and auxiliary pieces is converted to silicon nitride, especially at the locations on the sinter box that contact the article to avoid possible "gluing" of the silicon nitride article to unreacted silicon of the sinter box or auxiliary pieces during sintering. For maximum stability, it is preferred that the majority of the sinter box or the material which makes the box does not contain any sintering aids. The sinter box and auxiliary parts should be thick enough to provide structural stability through repeated sintering operations. Sinter boxes having wall thicknesses of $\frac{1}{8}$-$\frac{1}{4}$" thick have been found satisfactory.

Various shapes of sintering vessels and auxiliary pieces will work in this invention, as well as other variations on the design. For example, the sinter box may be used in the reverse of what is shown in FIGS. 1-3 in that the sinter box could rest on top surface 16, article 36 may be placed inside lid 14, and base 12 may then be placed on top of lid 14 to close opening 22. In other words, the base portion could then have the opening for placement of a silicon nitride article and a vertical wall or walls for surrounding the sides of the article, and the lid portion could be generally flat and used to place on top of the base portion opening to close the opening. Additionally, the sinter vessel may be cylindrically-or triangularly-shaped, etc. If the vessel is cylindrically-shaped, the lid portion may be cylindrically-shaped with a circular opening, and the base portion may be flat and circularly-shaped with a circular raised portion to match the opening in the lid.

Reaction-bonded silicon nitride sinter boxes are strong and stable and able to last through many sintering operations. During sintering operations, when, e.g., the furnace is formed of graphite, the outside of the sinter box acts as a sacrificial reactive site so that the silicon nitride article contained within does not react with the furnace material. As a sacrificial piece, the outside of the sinter box converts, forming a layer of silicon carbide.

Thus, there is provided in accordance with the present invention, a sinter vessel which eliminates the use of setter powder and provides complete protection to a silicon nitride article during sintering preventing the article from thermally decomposing or reacting with furnace materials.. In addition, the vessel is quick and easy to use, is reusable (thereby saving expense), and does not require additional steps of operation, such as cleaning the sintered article free of powder after sintering.

While my invention has been described in terms of a specific embodiment, it will be appreciated that other embodiments could readily be adapted by one skilled in the art. Accordingly, the scope of my invention is to be limited only by the following claims.

What is claimed is:

1. An enclosable vessel for containing silicon nitride article during sintering in a furnace to protect the silicon nitride article from thermal decomposition and contamination reactions with furnace materials, comprising:
   a closable walled container formed of silicon nitride having an opening t allow interior placement of the silicon nitride article within the walled container, wherein said container is usable in said furnace for sintering a silicon nitride article such that the closable walled container fits inside the furnace and affords protection to the silicon nitride article being sintered by enclosing it and protecting the article from contact with thermally decomposed material from the furnace.

2. The enclosable vessel of claim 1, wherein said vessel is formed of reaction bonded silicon nitride.

3. The enclosable vessel of claim 1, wherein the walled container is boxed-shaped.

4. The enclosable vessel of claim 1, wherein the walled container is cylindrically-shaped.

5. An enclosable vessel for containing a silicon nitride article during sintering in a furnace to protect the silicon nitride article from thermal decomposition and contamination reactions with furnace materials, comprising:
   a closable walled container formed of silicon nitride having an opening to allow interior placement of the silicon nitride article within the walled container, wherein the walled container is designed so that, when the opening is closed, a hole remains in the walled container for gaseous communication between the inside and the outside of the vessel, said container being usable in said furnace for sintering a silicon nitride article such that the closable walled container fits inside the sintering furnace and affords protection to the silicon nitride article being sintered by enclosing it and protecting the article from contact with thermally decomposed material from the furnace.

6. The enclosable vessel of claim 5, wherein said vessel is formed of reaction bonded silicon nitride.

7. The enclosable vessel of claim 5, wherein the walled container is box-shaped.

8. The enclosable vessel of claim 5, wherein the walled container is cylindrically-shaped.

9. The enclosable vessel of claim 5, wherein the walled container includes a base portion having the opening and a vertical wall for surrounding the sides of the article, the lid portion being generally flat for placement on top of the base portion to close the opening, together the lid portion and the base portion designed so that, when the lid portion is placed on top of the base portion to close the opening, a gap remains between the lid portion and the base portion for gaseous communication between the inside and the outside of the vessel.

10. The enclosable vessel of claim 5, wherein the walled container includes a base portion having an upper surface and a lid portion having the opening, the lid portion for placement on top of the base portion, together the lid portion and the base portion designed so that, when the lid portion is placed on the base portion to close the opening, gap remains between the lid portion and the base portion for gaseous communication between the inside and the outside of the vessel.

11. The enclosable vessel of claim 10, further comprising elongated support pieces formed of reaction bonded silicon nitride for placement on the upper surface of the base portion to separate the silicon nitride article from the base portion.

12. The enclosable vessel of claim 11, further comprising a flat support plate formed of reaction bonded silicon nitride for placement on top of the elongated support pieces to support the silicon nitride article.

13. The enclosable vessel of claim 10, wherein the base portion is generally flat and rectangularly-shaped and the lid portion is box-shaped.

14. The enclosable vessel of claim 10, wherein the base portion is generally flat and circularly-shaped and the lid portion is generally cylindrically-shaped.

15. The enclosable vessel of claim 13, wherein the base portion has a rectangularly-shaped raised portion on its upper surface having a generally flat upper surface and dimensioned to fit inside the opening of the lid portion.

16. The enclosable vessel of claim 10, wherein the base portion has a slit at a point of contact of the lid portion when the lid portion is placed thereon to close the opening, thereby forming a gap between the lid portion and the base portion.

17. The enclosable vessel of claim 10, wherein the lid portion has a slit at a point of contact of the base portion when the lid portion is placed thereon to close the opening, thereby forming a gap between the lid portion and the base portion.

18. An enclosable vessel for containing a silicon nitride article during sintering in a furnace to protect the silicon nitride article from thermal decomposition and contamination reactions with furnace materials, comprising:
   (a) a five-sided box-shaped lid portion formed of reaction bonded silicon nitride having a rectangularly-shaped opening at the bottom; and
   (b) a generally flat rectangular base portion formed of reaction bonded silicon nitride having a rectangularly-shaped raised portion dimensioned to fit within the opening of the lid portion, the raised portion having a flat surface for placement of the silicon nitride article, the base portion having a slit on the edge of each of its four sides so that, when the lid portion is put in place on the base portion to close the opening, the slits provide gaseous communication between the inside and the outside of the vessel, wherein said vessel is usable in said furnace for sintering the silicon nitride article such that the closable walled container fits inside the sintering furnace and affords protection to the silicon nitride article being sintered by enclosing it and protecting the article from contact with thermally decomposed material from the furnace.

19. The enclosable vessel of claim 18, further comprising elongated support pieces formed of reaction bonded silicon nitride form placement on the raised portion to separate the silicon nitride article from the enclosable vessel.

20. The enclosable vessel of claim 19, further comprising a flat support piece of reaction bonded silicon nitride for placement on the elongated support pieces for support of the silicon nitride article.

21. An enclosable vessel for containing a silicon nitride article during sintering in a furnace to protect the silicon nitride article from thermal decomposition and contamination reactions with furnace materials, comprising:

(a) a cylindrical walled lid portion formed of reaction bonded silicon nitride having a circularly-shaped opening at the bottom; and (b) a generally flat circular base portion formed of reaction bonded silicon nitride having a circularly-shaped raised portion dimensioned to fit within the opening of the lid portion, the raised portion having a flat surface for placement of the silicon nitride article, the base portion having a plurality of slits on the bottom edge of its wall so that, when the lid portion is put in place on the base portion to close the opening, the slits provide gaseous communication between the inside and the outside of the vessel, wherein said vessel is usable in said furnace for sintering the silicon nitride article such that the closable walled container fits inside the sintering furnace and affords protection to the silicon nitride article being sintered by enclosing it and protecting the article from contact with thermally decomposed material from the furnace.

* * * * *